United States Patent
Williams et al.

(10) Patent No.: US 10,243,345 B2
(45) Date of Patent: Mar. 26, 2019

(54) CIRCUIT BREAKER HAVING BREAKER INFORMATION MODULE AND METHOD OF USE

(71) Applicant: ABB Schweiz AG, Baden (CH)

(72) Inventors: Craig B. Williams, Louisville, KY (US); Srinath Topucharla, Andhra Pradesh (IN); Arun Kumar Singh, Andhra Pradesh (IN); Jeyaprakash Kandasamy, Andhra Pradesh (IN); Alok Kumar Bharati, Andhra Pradesh (IN)

(73) Assignee: AB Schweiz AG, Baden (CH)

( * ) Notice: Subject to any disclaimer, the term of this patent is extended or adjusted under 35 U.S.C. 154(b) by 530 days.

(21) Appl. No.: 14/788,471

(22) Filed: Jun. 30, 2015

(65) Prior Publication Data

US 2017/0005462 A1    Jan. 5, 2017

(51) Int. Cl.
*H02H 3/20* (2006.01)
*H02H 9/04* (2006.01)
(Continued)

(52) U.S. Cl.
CPC .............. *H02H 3/10* (2013.01); *H01H 71/74* (2013.01); *H02H 3/20* (2013.01); *H01H 71/04* (2013.01); *H02J 3/00* (2013.01)

(58) Field of Classification Search
CPC .................................. H02H 3/10; H02H 3/20
(Continued)

(56) References Cited

U.S. PATENT DOCUMENTS 4,057,785 A * 11/1977 Furniss ............... H02J 13/0055
340/870.15
4,780,786 A * 10/1988 Weynachter ......... H01H 1/0015
324/424
(Continued)

FOREIGN PATENT DOCUMENTS

CA      2540989 A1    9/2006
CA      2593646 A1    12/2007
(Continued)

OTHER PUBLICATIONS

"DIGITRIP RMS Trip Units: DIGITRIP RMS 510, DIGITRIP RMS 610, and POWERLOGIC DIGITRIP RMS 810D For Use in Types DS/DSL and DSII/DSLII Low Voltage Circuit Breakers," Instruction Bulletin 6035-510A, Square D, Nov. 1998, 72 pages.
(Continued)

*Primary Examiner* — Thienvu Tran
*Assistant Examiner* — Lucy Thomas
(74) *Attorney, Agent, or Firm* — Barnes & Thornburg LLP

(57) ABSTRACT

A circuit breaker is described herein. In one aspect, the circuit breaker includes a communication module, a non-transitory memory device, and a memory controller. The communication module is configured to receive protection settings and breaker information from a trip unit coupled to the communication module. The protection settings and the breaker information are received upon powering-on the trip unit. The non-transitory memory device is configured to store the protection settings and the breaker information associated with the circuit breaker. The memory controller is configured to cause the protection settings and the breaker information received to be written to the non-transitory memory device.

7 Claims, 3 Drawing Sheets

(51) Int. Cl.
*H02H 3/10* (2006.01)
*H01H 71/74* (2006.01)
*H01H 71/04* (2006.01)
*H02J 3/00* (2006.01)

(58) Field of Classification Search
USPC .............................................. 361/2, 42, 91.1
See application file for complete search history.

(56) References Cited

U.S. PATENT DOCUMENTS

| | | | |
|---|---|---|---|
| 5,315,499 | A | 5/1994 | Bilas et al. |
| 5,943,201 | A * | 8/1999 | Walker ................... H02H 3/006 361/64 |
| 6,005,758 | A | 12/1999 | Spencer et al. |
| 6,157,527 | A | 12/2000 | Spencer et al. |
| 6,212,049 | B1 | 4/2001 | Spencer et al. |
| 6,639,775 | B1 | 10/2003 | Musiol et al. |
| 7,633,736 | B2 | 12/2009 | Domitrovich et al. |
| 7,899,975 | B2 | 3/2011 | Driehorn et al. |
| 7,936,547 | B2 | 5/2011 | Dougherty et al. |
| 8,649,147 | B2 | 2/2014 | Schlotterer et al. |
| 8,654,496 | B2 | 2/2014 | Schlotterer et al. |
| 8,737,033 | B2 | 5/2014 | Parker et al. |
| 2006/0109599 | A1 * | 5/2006 | Holley ................... H01H 9/168 361/64 |
| 2006/0224711 | A1 | 10/2006 | Engel et al. |
| 2007/0297113 | A1 | 12/2007 | Domitrovich et al. |
| 2008/0158763 | A1 * | 7/2008 | Dougherty ......... H01H 71/7409 361/93.2 |
| 2009/0271559 | A1 | 10/2009 | Driehorn et al. |
| 2011/0186408 | A1 | 8/2011 | Manzoli et al. |
| 2012/0287543 | A1 | 11/2012 | Schlotterer et al. |
| 2013/0148249 | A1 | 6/2013 | Schlotterer et al. |
| 2014/0071575 | A1 | 3/2014 | Parker et al. |
| 2014/0278179 | A1 | 9/2014 | Dougherty |

FOREIGN PATENT DOCUMENTS

| | | |
|---|---|---|
| CN | 1881884 A | 12/2006 |
| CN | 100590945 C | 2/2010 |
| EP | 0600073 B1 | 9/2000 |
| EP | 1708460 A1 | 10/2006 |
| EP | 2040280 A2 | 3/2009 |
| EP | 2068337 B1 | 1/2012 |
| EP | 2707931 A2 | 3/2014 |
| EP | 2792039 A1 | 10/2014 |
| JP | 2854980 B2 | 2/1999 |
| JP | 5438305 B2 | 3/2014 |
| WO | 9400823 A1 | 1/1994 |
| WO | 2006103226 A1 | 10/2006 |
| WO | 2012156799 A3 | 1/2013 |
| WO | 2013089870 A1 | 6/2013 |
| WO | 2014039165 A1 | 3/2014 |

OTHER PUBLICATIONS

European Search Report and Opinion issued in connection with corresponding EP Application No. 16177106.8 dated Jan. 30, 2017.

* cited by examiner

CIRCUIT BREAKER HAVING BREAKER INFORMATION MODULE AND METHOD OF USE

BACKGROUND

The present application relates generally to circuit breakers, and more specifically, to a circuit breaker having a breaker information module (BIM) and a method of use thereof.

Circuit breakers generally include a switch, or contact system, controlled by a trip unit. The trip unit is typically implemented mechanically or electronically. In electronic trip units (ETUs), a current or voltage fault is sensed and a signal is generated that causes the switch to open. ETUs are typically programmable devices having non-transitory memory for storing protection settings and breaker information for the circuit breaker. Protection settings include instantaneous trip settings, long-delay trip settings, and short-delay trip settings, among others. Breaker information includes, for example, breaker calibration data, sensor characterization data, trip unit calibration data, breaker opening time, breaker running time, contact wear and erosion data, trip history, and field maintenance information.

Circuit breakers and contact systems typically have a longer service life than an ETU, which is a field replaceable device. Other field replaceable devices in circuit breakers include the contact system and current sensors. Certain information can be stored in the circuit breaker in a non-transitory memory device referred to as a breaker information module (BIM). A BIM typically stores static data, such as protection settings and other data that change infrequently. When a new ETU is installed in a circuit breaker, the ETU is configured for the circuit breaker through a marrying process.

BRIEF DESCRIPTION

In one aspect, a circuit breaker is provided. The circuit breaker includes a communication module, a non-transitory memory device, and a memory controller. The communication module is configured to receive protection settings and breaker information from a trip unit coupled to the communication module. The protection settings and the breaker information are received upon powering-on the trip unit. The non-transitory memory device is configured to store the protection settings and the breaker information associated with the circuit breaker. The memory controller is configured to cause the protection settings and the breaker information received to be written to the non-transitory memory device.

In another aspect, a system is provided. The system includes a trip unit, a communication channel, and a circuit breaker. The trip unit is associated with protection settings. The circuit breaker includes a breaker information module (BIM) configured to store the protection settings and the breaker information upon powering on the trip unit. The circuit breaker is coupled to the trip unit through the communication channel.

In yet another aspect, a method of operating a circuit breaker is provided. The method includes powering on a trip unit coupled to the circuit breaker. The circuit breaker has protection settings and breaker information stored within. The method further includes writing the protection settings and the breaker information to a breaker information module (BIM) upon powering on the trip unit. The BIM is associated with the circuit breaker.

DETAILED DESCRIPTION

Exemplary embodiments of a circuit breaker having a breaker information module (BIM) are described herein. In an exemplary embodiment, protection settings and breaker information are automatically saved to the BIM upon powering on the trip unit. The BIM facilitates ensuring the most up-to-date parameters for the circuit breaker are retained with the circuit breaker, including data associated with the trip unit, the sensors, and the contact system. In the event a trip unit or sensor is replaced, the BIM remains with the circuit breaker and serves as a data repository for the protection settings and breaker information. Upon installation of a replacement sensor or replacement trip unit, protection settings and breaker information can be retrieved, including sensor characterization data and trip unit calibration data.

Figure 1:
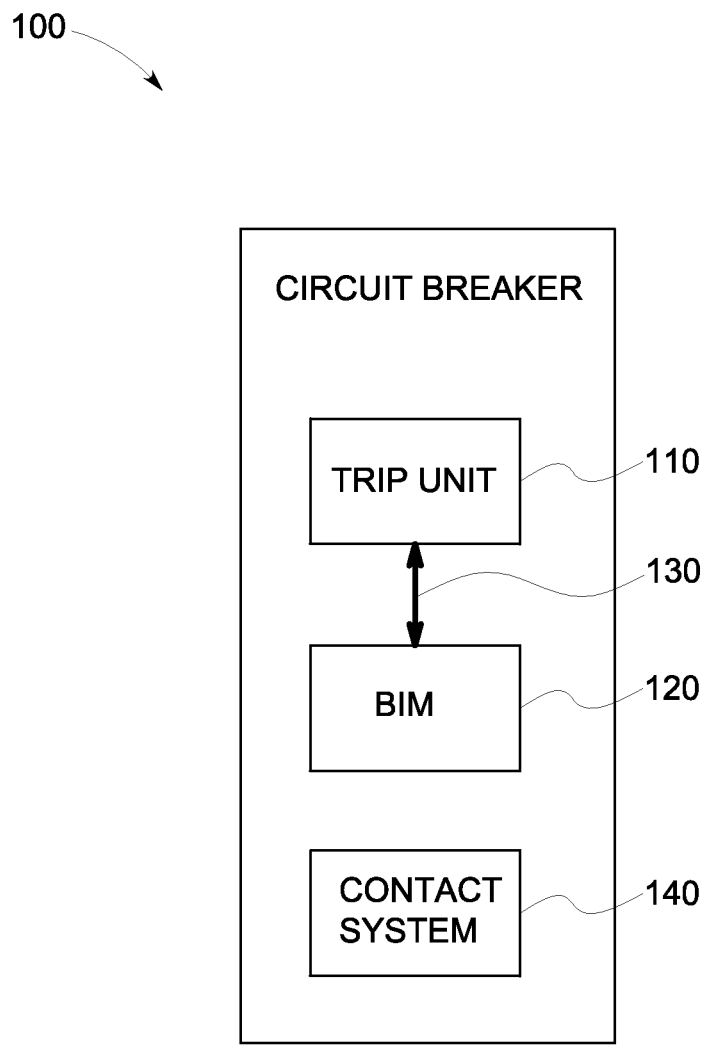
FIG. 1 is a block diagram of one embodiment of a circuit breaker.

FIG. 1 is a block diagram of one embodiment of a circuit breaker 100. Circuit breaker 100 includes an electronic trip unit 110 and a BIM 120. Electronic trip unit 110 and BIM 120 communicate over a communication channel 130. Circuit breaker 100 also includes a contact system 140 that makes and breaks the circuit. Electronic trip unit 110 controls the opening, i.e., tripping or breaking, of contact system 140 in the event of a short circuit, fault, or thermal overload. Electronic trip unit 110 includes at least one sensor component that facilitates detection of a trip condition. Electronic trip unit 110 is further configured to store protection settings and breaker information. Protection settings and certain breaker information are stored on electronic trip unit 110 and are used during operation of circuit breaker 100.

BIM 120 is configured to store protection settings and breaker information for circuit breaker 100. The stored protection settings and breaker information are updated or read from BIM 120 via communication channel 130 under various circumstances. For example, upon a triggering event, such as powering up electronic trip unit 110, protection settings and breaker information are transmitted from electronic trip unit 110 over communication channel 130 to BIM 120 and saved. Further, for example, when electronic trip unit 110 or one of its components is replaced, protection settings and breaker information can be read from BIM 120 and transmitted to electronic trip unit 110 over communication channel 130. During such maintenance activity, electronic trip unit 110 can be powered externally by an auxiliary power source. Certain breaker information and protection settings are then updated and written to BIM 120.

In certain embodiments, breaker information is updated upon a tripping of circuit breaker 100 and the opening of contact system 140. Electronic trip unit 110 initiates the update procedure upon detection of the condition that causes the trip, which is referred to as a triggering event. Breaker information that is updated includes contact wear, the breaker opening time, and the running time up to the trip, which is the time the breaker is powered on leading up to the trip. Upon the trip, the updated breaker information is stored in electronic trip unit 110. After the trip, while electronic trip unit 110 is running on auxiliary power or when contact system 140 is next closed, electronic trip unit 110 writes the updated breaker information to BIM 120 over communication channel 130. BIM 120 then transmits a save-acknowledgment message to electronic trip unit 110 over communication channel 130.

In certain embodiments, communication channel 130 is operable at sufficient speeds for electronic trip unit 110 to use protection settings and breaker information stored on BIM 120 during operation of circuit breaker 100.

Figure 2:
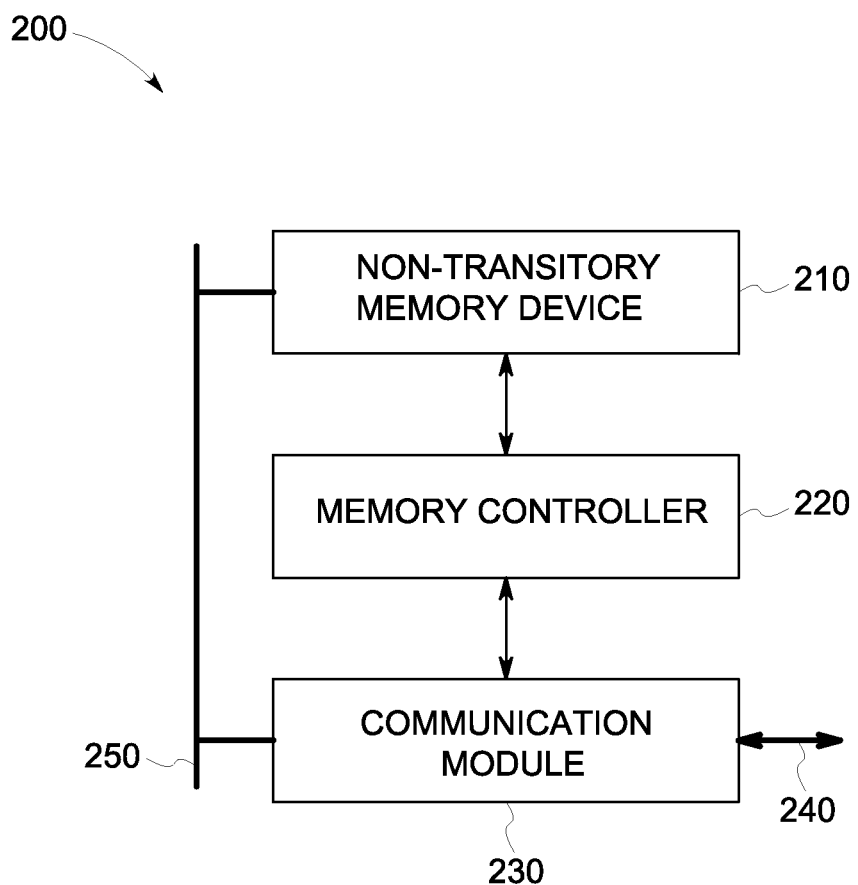
FIG. 2 is a block diagram of one embodiment of a breaker information module (BIM) for a circuit breaker.

FIG. 2 is a block diagram of one embodiment of BIM 200 for a circuit breaker, such as circuit breaker 100 (shown in FIG. 1). BIM 200 includes a non-transitory memory device 210, a memory controller 220, and a communication module 230. Communication module 230 interfaces with a communication channel 240 through which BIM 200 communicates with an electronic trip unit (not shown). Data is read from and written to non-transitory memory device 210 over a data bus 250. In certain embodiments, non-transitory memory device 210 includes read-only memory that is programmable during manufacturing, but not in the field. Such read-only memory is configured to store data including manufacture date and serial number, which never change. In certain embodiments, non-transitory memory device 210 includes read/write memory that can be programmed in the field by an electronic trip unit or through a maintenance terminal Non-transitory memory device 210, in certain embodiments, includes a single memory integrated circuit having certain addresses reserved for read-only memory and other addresses reserved for read/write memory. In alternative embodiments, non-transitory memory device 210 includes multiple memory integrated circuits. In such an embodiment, the read-only memory integrated circuit would only accept read commands, while the read/write memory integrated circuit would receive both read and write commands.

Data received at communication module 230 over communication channel 240 is written to non-transitory memory device 210 over data bus 250. Data stored on non-transitory memory device 210 is read and transmitted over communication channel 240 by communication module 230 using data bus 250. Memory controller 220 manages the reading and writing over data bus 250 for non-transitory memory device 210.

Non-transitory memory device 210 is configured to store protection settings and breaker information. Protection settings include, for example, instantaneous current thresholds, long-delay thresholds, and short-delay thresholds. Breaker information includes, for example, contact wear and erosion data, breaker running time, trip history, breaker opening time, breaker calibration data, sensor characterization data, trip unit calibration data, and field maintenance data.

Protection settings and breaker information are written to non-transitory memory device 210 under various circumstances. For example, upon powering on the electronic trip unit, protection settings and breaker information are received over communication channel 240 at communication module 230. Memory controller 220 causes the received protection settings and breaker information to be written to non-transitory memory device 210. Protection settings and breaker information are also written to non-transitory memory device 210 when a parameter is updated while the electronic trip unit is powered on. Protection settings and breaker information are also received and written when the breaker opens. These circumstances, for example, facilitate ensuring the most up-to-date protection settings and breaker information are received at communication module 230 and stored in non-transitory memory device 210.

Certain breaker information may be written to non-transitory memory device 210 during maintenance activities. For example, in the event a sensor is replaced in the circuit breaker, updated sensor characterization data is received over communication channel 240 by communication module 230 and written to non-transitory memory device 210. Similarly, during manufacturing or later refurbishment, protection settings and breaker information is written to non-transitory memory device 210.

Upon saving protection settings and breaker information in non-transitory memory device 210, communication module 230 transmits a save-acknowledgment message to the electronic trip unit.

Protection settings and breaker information may be read from non-transitory memory device 210 under various circumstances. For example, when the electronic trip unit is replaced, memory controller 220 causes protection settings and breaker information stored in non-transitory memory device 210 to be read to data bus 250 and then communication module 230. Communication module 230 then transmits the protection settings and breaker information to the electronic trip unit over communication channel 240. Similarly, upon powering up the electronic trip unit, in certain embodiments, a query is received over communication channel 240 at communication module 230. Certain breaker information stored on non-transitory memory device 210 is transmitted by communication module 230 over communication channel 240 to the electronic trip unit in response. In such embodiments, the query may include protection settings and power ratings to ensure the circuit breaker-trip unit combination is proper. If the combination is proper, other protection settings and breaker information are read from non-transitory memory device 210. If the combination is improper, the circuit breaker is tripped and the trip logged in non-transitory memory device 210. This process is referred to as a marry/unmarry process.

Figure 3:
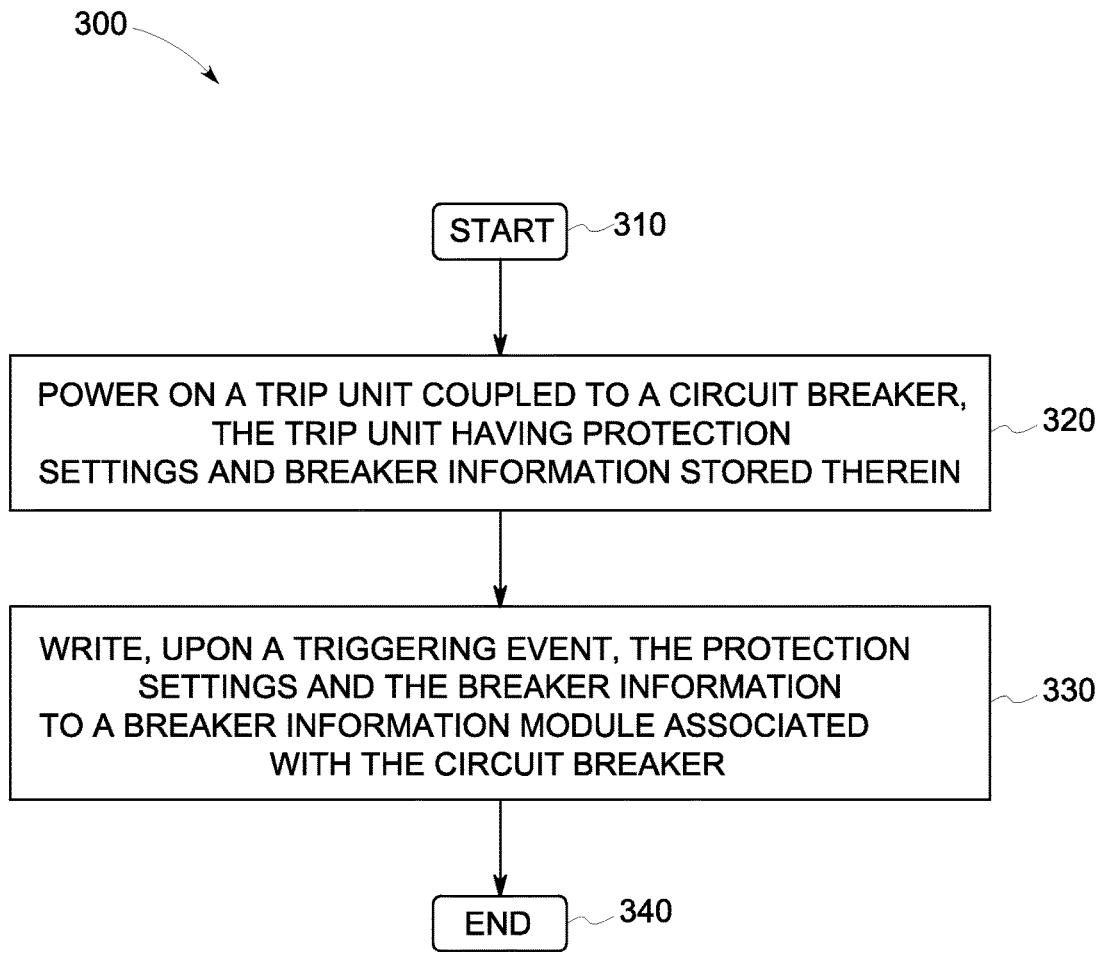
FIG. 3 is a flow diagram of one embodiment of a method of operating a circuit breaker.

FIG. 3 is a flow diagram of one embodiment of a method 300 of operating a circuit breaker, such as circuit breaker 100 (shown in FIG. 1). Method 300 begins at a start step 310. At a power-on step 320, a trip unit, such as trip unit 110 (shown in FIG. 1) is powered on. The trip unit can be powered by an auxiliary power source or self powered when the circuit is closed. The trip unit is coupled to a circuit breaker, such as circuit breaker 100. The trip unit is further configured to store protection settings and breaker information. At a write step 330, upon powering on, the protection settings and the breaker information are written to a BIM associated with the circuit breaker, such as BIM 120 or BIM 200 (shown in FIGS. 1 and 2). The method ends at an end step 340.

In alternative embodiments, method 300 includes updating at least one of protection settings and breaker information in the trip unit. In such an embodiment, the trip unit writes the updated information to the BIM over a communication channel. The BIM then transmits an acknowledgment message over the communication channel to the trip unit. If the trip unit fails to receive the acknowledgment, the trip unit can initiate another writing process to update the information in the BIM. Such an update may, in certain embodiments, require a password to gain access to the non-transitory memory in the trip unit. In certain embodiments where the BIM includes read-only memory, no password is available to permit overwriting information stored in the BIM.

A technical effect of the methods and systems described herein may include one or more of: (a) ensuring updating of settings; (b) ensuring accuracy and correct performance of the circuit breaker; (c) facilitating storage of contact wear data and maintenance information; (d) improving service life through optimization according to contact wear data and maintenance information; and (e) reducing configuration time during field replacement of components, including sensors and the trip unit.

Exemplary embodiments of a circuit breaker and method of operating a circuit breaker are described above in detail. The circuit breaker and methods are not limited to the specific embodiments described herein but, rather, components of the circuit breaker and/or operations of the methods may be utilized independently and separately from other components and/or operations described herein. Further, the described components and/or operations may also be defined in, or used in combination with, other systems, methods, and/or devices, and are not limited to practice with only the circuit breaker systems as described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    a circuit breaker comprising a circuit breaker information module (BIM), a communication channel, and a trip unit;
    the trip unit configured to store protection settings and to control an operation of the circuit breaker therewith, the trip unit being selectively removable from the circuit breaker;
    the BIM communicatively coupled to the trip unit via the communication channel, and configured to store protection settings and circuit breaker information therein;
    wherein the protection settings and breaker information are stored in the BIM in the event the trip unit is removed from the circuit breaker and the BIM is further configured to provide, in response to a determination that the trip unit has been installed into the system after a previous trip unit has been removed from the system, sensor characterization data that was written to the BIM by the previous trip unit, wherein the sensor characterization data is indicative of settings usable by the trip unit to communicate with a sensor of the system.

2. The system in accordance with claim 1, wherein said trip unit comprises a memory device configured to store the protection settings.

3. The system in accordance with claim 1, wherein said communication channel comprises a full-duplex channel.

4. The system in accordance with claim 1, wherein said trip unit comprises the sensor and the sensor is configured to generate signals upon which control of said circuit breaker is based.

5. The system in accordance with claim 1, wherein said trip unit is configured to update the protection settings based on information received from the BIM.

6. The system in accordance with claim 5, wherein said trip unit is configured to:
    store updated breaker information in a trip unit memory device;
    transmit the updated breaker information to said BIM over said communication channel; and
    generate a warning if no indication of a successful write of the updated breaker information to said BIM is received at said trip unit.

7. The system in accordance with claim 1, wherein a powering-on of the trip unit triggers an update of information from the trip unit to the BIM.

* * * * *